United States Patent Office
3,305,573
Patented Feb. 21, 1967

3,305,573
TETRAVALENT STABILIZERS
Kenneth R. Molt, Ingenuin Hechenbleikner, and Otto A. Homberg, Cincinnati, Ohio, assignors to Carlisle Chemical Works, Inc., Reading, Ohio, a corporation of Ohio
No Drawing. Filed Jan. 23, 1963, Ser. No. 253,248
8 Claims. (Cl. 260—448.8)

This application is a continuation-in-part of application 139,877 filed September 22, 1961, now Patent No. 3,208,966.

The present invention relates to novel organosilicon compounds and to the stabilization of solid polymers of monoolefins having 2 to 4 carbon atoms, preferably polypropylene.

A further object is to stabilize polypropylene and other polymers of monoolefins having 2 to 4 carbon atoms with synergistic stabilizer compositions.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing certain organosilicon esters of sulfur containing carboxylic acids or esters thereof and by stabilizing polymers of monoolefins, preferably polypropylene, with these and other organosilicon esters of sulfur containing carboxylic acids and esters thereof.

The novel compounds include alkyl, e.g., 1–20 carbon atoms, cycloalkyl, e.g., cyclohexyl, aralkyl, e.g., benzyl, carbocyclic aryl, e.g. phenyl, alkyl phenyl and naphthyl, and haloaryl, e.g., halophenyl, silicon esters of compounds having the formula $HSR_1COOR_2$ wherein $R_1$ is an alkylene group and $R_2$ is hydrocarbon, e.g., alkyl, cycloalkyl, aralkyl, carbocyclic aryl or haloaryl. Such compounds have the formula $$(R_3)_nSi(SR_1COOR_2)_{4-n}$$

I where $R_1$ and $R_2$ are as defined above, $R_3$ has the same definition as $R_2$ and $n$ is an integer from 1 to 3 inclusive. Also included within the novel compounds of the present invention are materials having the formula

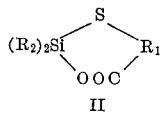

II where $R_1$ and $R_2$ are as previously defined. Preferably $R_1$ is an alkylene group of not over two carbon atoms.

Examples of compounds within the invention include diphenylsilicon mercaptoacetate (diphenylsilicon thioglycolate), di p-tolylsilicon mercaptoacetate, di β-naphthylsilicon mercaptopropionate, diphenylsilicon mercaptobutyrate, diphenylsilicon mercaptopropionate, di p-dodecylphenylsilicon mercaptopropionate, diphenylsilicon mercaptostearate, dibutylsilicon mercaptopropionate, dibutylsilicon mercaptoacetate, dibutylsilicon mercaptobutyrate, dibutylsilicon mercaptostearate, dimethylsilicon mercaptopropionate, dioctylsilicon mercaptoacetate, dibenzylsilicon mercaptopropionate, dicyclohexylsilicon mercaptoacetate, dibutylsilicon di(octadecyl mercaptopropionate), tributylsilicon mono mercaptoacetate, tributylsilicon mono mercaptooctoate, tributylsilicon mono mercaptopropionate, butylsilicon trimercaptopropionate, butylsilicon trimercaptoacetate, butylsilicon trimercaptobutyrate, dimethylsilicon mercaptoacetate, dibutylsilicon ethyl mercaptoacetate, dibutylsilicon phenyl mercaptoacetate, dioctylsilicon benzyl mercaptoacetate, dibutylsilicon chlorophenyl mercaptoacetate, dioctylsilicon mercaptopropionate, trioctylsilicon octadecyl mercaptopropionate, dibutylsilicon benzyl mercaptoacetate, octylsilicon triphenyl mercaptopropionate, tributylsilicon butylphenyl mercaptoacetate, hexylsilicon tricyclohexyl mercaptobutyrate, triethylsilicon α-naphthyl mercaptopropionate, tripropylsilicon chlorophenyl mercaptovalerate.

Compounds of Formula I are prepared by reacting a compound having the formula $(R_3)_nSiCl_{(4-n)}$ with a compound having the formula $HS(CH_2)_xCOOR_2$ where $R_2$ and $R_3$ are as defined above, $n$ is 1 and 3 and X is an integer, preferably between 1 and 3. When $n$ is 1 then 3 moles of the $HS(CH_2)_xCOOR_2$ compound are used per mole of the $(R_3)_nSiCl_{(4-n)}$ compound. When $n$ is 3 then 1 mole of the $HS(CH_2)_xCOOR_2$ compound is used per mole of the $(R_3)_nSiCl_{(4-n)}$ compound.

Compounds of Formula II are prepared by reacting 1 mole of a compound, having the formula $(R_3)_2SiCl_2$ with 1 mole of a compound having the formula

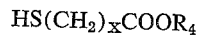

where $R_3$ and X are as defined above and $R_4$ is hydrogen or an alkali metal.

In the reaction the organo groups attached to the silicon are not removed but the chlorine is removed as sodium chloride or hydrogen chloride, for example. The methods for carrying out the reaction can be those conventionally employed for reacting an organosilicon halide with a thiol. Typical of such reaction procedure which can be employed are those used in Orkin Patent No. 2,592,175.

While the stabilizers of the present invention can be used with polyethylene, polypropylene, ethylene-propylene copolymers (e.g. a 50–50 copolymer), polybutylene and polyisobutylene, they are preferably employed with polymers and copolymers of propylene. The problems of stabilizing polypropylene are more complex than are those of stabilizing polyethylene. Polypropylene contains a tertiary carbon atom which is easily oxidized. This is missing from polyethylene. The problems of stabilizing the monoolefin polymers are completely different from those of stabilizing polyvinyl chloride. The monoolefin polymer stabilizers of the present invention are ineffective as polyvinyl chloride stabilizers.

The present invention is suitable for the stabilization of the monoolefin polymers regardless of the method employed to prepare the polymer. Thus, there can be stabilized polyethylene, polypropylene, polybutylene and copolymers of ethylene with propylene prepared with Zeigler type polymerization catalysts, e.g., trialkyl aluminum (tributyl aluminum) with titanium tetrachloride and dibutyl beryllium with titanium tetrachloride. The polymers can be prepared using any of the Ziegler type of catalysts as set forth in Salyer Patent 2,985,617, issued May 23, 1961, for example. However, the stabilizers of the present invention can be employed with polymers of monoolefins prepared by other processes, e.g., polyethylene prepared under high pressure as set forth in Fawcett Patent 2,153,553, for example, or polyethylene, polypropylene or copolymers prepared using Phillips Petroleum or Standard Oil of Indiana type catalysts.

The organosilicon esters can be used as stabilizers in an amount of 0.01–10% by weight of the monoolefin polymer. Preferably 0.1–5% of the stabilizer is employed. When the organosilicon esters are employed together with other stabilizers usually 0.01–10% and preferably 0.1–5% of total stabilizer based on the weight of the polymer is employed.

As previously set forth, the organosilicon compounds can be employed alone. However, synergistic action has been observed when the organosilicon esters are employed together with certain other stabilizers. Particularly good results are obtained when there is employed in addition to the organosilicon ester a neutral sulfur compound having a thio linkage beta to a carbon atom having both a hydrogen atom and a carboxyl group attached thereto. Such compounds are used in an amount of 0.01–10% by weight, preferably 0.1–5%. The preferred thio compound is dilauryl thiodipropionate. Other thio compounds include distearyl-3,3'-thiodipropionate (diocta-decyl-thiodipropionate), dicyclohexyl-3,3'-thiodipropionate, dicetyl-3,3'-thiodipropionate, dihexyl-3,3'-thiodipropionate, dioctyl-3,3'-thiodipropionate, dibenzyl-3,3'-thiodipropionate, lauryl myristyl-3,3'-thiodipropionate, diphenyl-3,3'-thiodipropionate, di-p-methoxyphenyl - 3,3'-thiodipropionate, didecyl-3,3'-thiodipropionate, dibenzyl-3,3'-thiodipropionate, diethyl-3,3'-thiodipropionate, lauryl ester of 3-methylmercapto propionic acid, lauryl ester of 3-butylmercapto propionic acid, lauryl ester of 3-laurylmercapto propionic acid, phenyl ester of 3-octylmercapto propionic acid, lauryl ester of 3-phenylmercapto propionic acid, lauryl ester of 3-benzylmercapto propionic acid, lauryl ester of 3-(p-methoxy)phenylmercapto propionic acid, lauryl ester of 3-cyclohexylmercapto propionic acid, lauryl ester of 3-hydroxymethylmercapto propionic acid, myristyl ester of 3-hydroxyethylmercapto propionic acid, octyl ester of 3-methoxymethylmercapto propionic acid, dilauryl ester of 3-carboxymethylmercapto propionic acid, dilauryl ester of 3-carboxypropylmercapto propionic acid, dilauryl-4,7-dithiasebacate, dilauryl-4,7,8,11-tetrathiatetradecandioate, dimyristyl-4,11-dithiatetradecandioate, lauryl-3-benzothiazylmercapto propionate, as well as other alkyl, cycloalkyl and aryl esters of the beta thiocarboxylic acids set forth in Gribbins Patent 2,519,755. Preferably, the esterifying alcohol has 10 to 18 carbon atoms.

Other beta thiocarboxylic acids include stearyl(1,2-dicarboethoxyethylthio)acetate, stearyl-(1,2-dicarbolauryloxyethylthio)acetate, lauryl(1,2 - dicarboethoxyethylthio)acetate or the like. Compounds of this type can be made in known fashion by addition of an alkyl ester of mercaptoacetic acid to a dialkyl ester of maleic acid. Similar beta thiocarboxyl compounds can be used which are made by addition of an RSH compound across the maleic ester double bond and where R is alkyl, aryl, alkylcarboxyalkyl, arylcarboxyalkyl or aralkyl. Examples of such compounds are decylthiodilaurylmaleate, phenylthiodioctyl maleate, cetyl(1,2-dicarboethoxyethylthio)propionate, and benzylthiodimyristyl maleate.

Similarly, useful beta thiocarboxyl compounds can be prepared by addition of the RSH compounds as defined above across the double bond of dialkyl itaconates, dialkyl citraconates, dialkyl fumarates, or trialkyl aconitates, e.g., the addition produce of lauryl mercaptan with dibutyl itaconate, the addition product of the stearyl ester with mercaptoacetic acid with dilauryl itaconate, the addition product of butyl mercaptan with dilauryl citraconate, the addition product of lauryl mercaptan with tributyl aconitate, the addition product of the lauryl ester of mercapto propionic acid with triethyl aconitate.

The thermal stability of the polypropylene and other polymers of a monoolefin is adversely affected by impurities including residual catalyst. When thermal stability is important in addition to oxidative stability it has been found valuable to include alkaline earth metal salts of fatty acids in an amount of 0.01–10% by weight, preferably 0.1–5%, in the organosilicon ester formulations. Examples of such salts are calcium stearate, calcium 2-ethylhexoate, calcium octoate, calcium oleate, calcium ricinoleate, calcium myristate, calcium palmitate, calcium laurate, barium laurate, barium stearate and magnesium stearate. Other fatty acid salts such as cadmium 2-ethylhexoate, zinc stearate, and cadmium stearate can also be employed.

Particularly effective synergistic stabilizing compositions have been obtained by utilizing a mixture of (1) the organosilicon ester, (2) the thio compound, particularly dilauryl thiodipropionate, and (3) the alkaline earth metal salt of a fatty acid.

The addition of phenolic antioxidants in an amount of 0.01–10% by weight, preferably 0.1–5% also has proved effective. Examples of such phenols include 2,6-di-t-butyl-p-cresol, butylated hydroxyanisole, propyl gallate, 4,4'-thiobis(6-tertiary-butyl-m-cresol), 4,4'-cyclohexylidene diphenol, 2,5-di-tertiary-amyl hydroquinone, 4,4'-butylidene bis (6-tertiary-butyl-m-cresol), hydroquinone monobenzyl ether, 2,2'-methylene-bis(4-methyl-6-t-butylphenol), as well as the other phenols as set forth in Salyer Patent 2,985,617. Other suitable phenols include 2-tertiary-butyl-4-decyloxyphenol, 2-tertiary-butyl-4-dodecyloxyphenol, 2-tertiary-butyl-4 - octadecyloxyphenol, 4,4'-methylene-bis(2,6-ditertiary butyl phenol), p-aminophenol, N-lauryl - p - aminophenol, 4,4' - thiobis(3-methyl-6-t - butyl phenol), bis[o - (1,1,3,3 - tetramethylbutyl)phenol]sulfide, 4-acetyl-β-resorcyclic acid, A-stage p-tertiary butylphenol-formaldehyde resin, 4-dodecyloxy-2-hydroxy-benzophenone, 3-hydroxy-4-(phenyl-carbonyl) phenyl palmitate, n-dodecyl ester of 3-hydroxy-4-(phenylcarbonyl)phenoxyacetic acid and t-butylphenol.

The use of epoxy compounds in an amount of 0.01–10% by weight, preferably 0.1–5% in the organosilicon ester formulations has also been found valuable. Examples of such epoxy compounds include epoxidized soya oil, epoxidized lard oil, epoxidized olive oil, epoxidized linseed oil, epoxidized castor oil, epoxidized peanut oil, epoxidized corn oil, epoxidized tung oil, epoxidized cottonseed oil, epichlorhydrin-bisphenol A resins, phenoxypropylene oxide, butoxy-propylene oxide, epoxidized neopentylene oleate, glycidyl epoxystearate, epoxidized α-olefins, epoxidized glycidyl soyate, dicyclopentadiene dioxide, epoxidized butyl tallate, styrene oxide, dipentene dioxide, glycidol, vinyl cyclohexene dioxide, glycidyl ether of resorcinol, glycidyl ether of hydroquinone, glycidyl ether of 1,5-dihydroxy naphthalene, epoxidized linseed oil fatty acids, allyl glycidyl ether, butyl glycidyl ether, cyclohexane oxide, 4-(2,3-epoxypropoxy)acetyl phenone, mesityl oxide epoxide, 2-ethyl-3-propyl glycidamide, glycidyl ethers of glycerine, pentaerythritol and sorbitol, and 3,4-epoxycyclohexane - 1,1 - dimethanol bis(9,10 - epoxystearate).

Likewise it has been found desirable to include neutral esters of citric acid, particularly acetyl tributyl citrate and tributyl citrate in an amount of 0.01–10% by weight, preferably 0.1–5%, in the organosilicon ester formulations. Examples of such citrates include neutral citrates having the formula

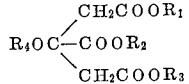

where $R_1$, $R_2$ and $R_3$ are selected from the group consisting of hydrocarbon, e.g., alkyl, aryl and cycloalkyl, and haloaryl and $R_4$ is selected from the group consisting of hydrogen, hydrocarbon, e.g., alkyl, aryl and cycloalkyl, or acyl groups. Preferably, the acyl group has 2 to 4 carbon atoms. Typical examples of such citrates are triethyl citrate, trimethyl citrate, tripropyl citrate, triisopropyl citrate, tributyl citrate, propyldibutyl citrate, tritertiary butyl citrate, triamyl citrate, trihexyl cirate, trioctyl citrate, tridecyl citrate, trioctadecyl citrate, tricyclohexyl citrate, triphenyl citrate, tribenzyl citrate, tri-p-tolyl citrate, tri-p-chlorophenyl citrate, acetyl trimethyl citrate, acetyl triethyl citrate, acetyl tripropyl citrate, acetyl tributyl citrate, acetyl propyldibutyl citrate, acetyl triamyl citrate, acetyl trioctyl citrate, acetyl trioctadecyl citrate, propionyl tributyl citrate, butyryl tributyl citrate, butyl tributyl citrate, phenyl tributyl citrate, chlorophenyl tributyl citrate, and acetyl triphenyl citrate.

The use of the citrates as stabilizers for polymers of monoolefins, particularly polypropylene, is claimed in copending application, Serial No. 135,804, filed September 5, 1961, now Patent No. 3,251,796.

Likewise there can be used dihydrocarbon tin salts of thiodipropionic acid in an amount of 0.01–10%, preferably 0.1–5%, with the organosilicon esters in stabilizing the polypropylene and other monoolefin polymers. Examples of such tin compounds include dibutyltin thiodipropionate, dioctyltin thiodipropionate, diphenyltin thiodipropionate, dilauryltin thiodipropionate and dineopentyltin thiodipropionate. These compounds can be made by reacting dihydrocarbontin oxide with thiodipropionic acid. Other tin compounds which can be used in like amounts include dihydrocarbon tin esters of carboxy mercaptals such as dibutyltin propane-2,2-bis(mercaptopropionate), dibutyltin benzaldi(mercaptoacetate), dibutyltin benzaldi(mercaptopropionate), dineopentyltin propane-2,2-bis(mercaptopropionate), dibutyltin cyclohexyl-1,1-bis-(mercaptopropionate), dimethyltin propane-1,2-bis-(omega mercaptooctanoate), dioctadecyltin methane bis-(mercaptoacetate), diphenyltin propane-2,2-bis(mercaptopropionate), dibutyltin propene-3,3-bis(mercaptopropionate), butyl lauryltin phenylacetaldi(mercaptoacetate), dihexyltin 2-butene-1,1-bis(mercaptopropionate), dibutyltin diphenylmethane bis(mercaptopropionate), dibenzyltin propane-2-mercaptoacetate-2-mercaptopropionate, dibutyltin 2-hydroxy-4-methoxybenzaldi(mercaptobutyrate) and dibutyltin propane-2,2-bis(mercaptosuccinate). The tin salts of the carboxy mercaptals can be prepared as set forth in Hechenbleikner et al. application 103,256 filed April 17, 1961, now Patent No. 3,078,290. The use of the various tin compounds as stabilizers for monoolefin polymers, preferably polypropylene, is claimed in application Serial No. 139,876 filed September 22, 1961, now Patent No. 3,209,017.

Additionally, there can be employed pseudothiohydantoins in an amount of 0.01–10% by weight, preferably 0.1–5%, with the organosilicon esters in stabilizing the monoolefin polymers, e.g., polypropylenes. Examples of such pseudohydantoins include pseudothiohydantoin, 5-cetyl pseudothiohydantoin, $N^2$-nonylpseudothiohydantoin, 3,$N^2$-o-phenylenepseudothiohydantoin, 3,$N^2$-ethylenepseudothiohydantoin, 3,$N^2$-dioctylpseudothiohydantoin, 5,5-dimethylpseudothiohydantoin, 5-phenylpseudothiohydantoin, 5-p-tolylpseudothiohydantoin, 5-p-chlorophenylpseudithiohydantoin, and 3,$N^2$-diphenylpseudothiohydantoin. The use of pseudothiohydantoins as stabilizers for monoolefin polymers is claimed in application Serial No. 138,002 filed September 14, 1961, now abandoned.

Unless otherwise indicated all parts and percentages are by weight. The parts of stabilizer in the examples are per 100 parts of polymer.

The stability tests were carried out at 133° C. The polypropylenes employed were a Hercules Profax resin having a melt index of 0.4 and Hercules Profax resin 6501 which had a melt index of 0.8. The polypropylene of melt index 0.4 took less than 24 hours to degrade under the conditions of the stability test and the polypropylene melt index 0.8 took 48 hours to degrade under these conditions.

In preparing the polypropylene samples for the tests the samples were blended in methylene chloride with the indicated stabilizing substances. The solvent was evaporated and the polymer dried in an oven at 60° C. for four hours and then pressed into a 20 mil panel. Samples of the panel measuring 3 inches by ½-inch were suspended in a forced draft oven at 133° C. and the time required to bring about degradation of the polymer noted.

Typical examples of the preparation of the organosilicon esters are set forth below.

EXAMPLE 1

A mixture of 0.1 mole of mercaptopropionic acid and 0.2 mole of sodium hydroxide in 100 grams of toluene was heated under reflux until 0.2 mole of water had azeotroped off. The resulting suspension was treated with 0.1 mole of dibutylsilicon dichloride and refluxing was continued for 2 additional hours. After cooling the mixture and removing the sodium chloride by filtration, the solvent was removed under reduced pressure to yield dibutylsilicon mercaptopropionate as a yellow oil, percent S 11.95 (theory 12.95).

This compound has the formula

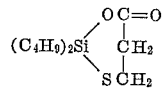

EXAMPLE 2

0.3 mole of lauryl mercaptopropionate and 0.3 mole of sodium hydroxide were refluxed with toluene for 2 hours. The water formed by reaction was removed in a Dean and Stark water trap. Then there was added 0.1 mole of butylsilicon trichloride and the mixture heated for 2 hours. The salt was filtered off and the solvent removed in vacuo. The produce was butylsilicon tris lauryl mercaptopropionate.

EXAMPLE 3

The process of Example 2 was repeated using 0.1 mole of butyl mercaptoacetate, 0.1 mole of sodium hydroxide and 0.1 mole of trioctylsilicon chloride to produce trioctylsilicon butyl mercaptoacetate.

EXAMPLE 4

0.1 mole of 3-mercaptopropionic acid and 0.2 mole of sodium were refluxed for 2 hours with 100 grams of toluene. The water formed by the reaction was collected in a Dean and Stark water trap and removed. Then 0.1 mole of diphenylsilicon dichloride was added and refluxing continued for 2 hours. After cooling, the salt was removed by filtration. The solvent was removed in vacuo. The yield of product was 27.9 grams (theory 28.6 grams). S, 11.3% (theory 11.7%), Cl, 0.2% (theory 0%). The product was diphenylsilicon thiopropionate and had the formula

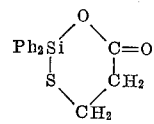

EXAMPLE 5

The process of Example 4 was repeated replacing the 3-mercaptopropionic acid by 0.1 mole of thioglycolic acid. The product was diphenylsilicon thioglycolate having the formula

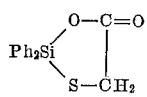

yield 27.4 grams (theory 27.2 grams), S, 11.6% (theory 11.75%), Cl, 0.3% (theory 0%).

The stabilization results at 133° C. are shown in the following examples. The polymer in Example 7 was Alathon 14, a lower density, high pressure polyethylene (molecular weight about 20,000, density about 0.916). The polymer in the other examples was polypropylene having the indicated melt index.

EXAMPLE 6

The stabilizer was 0.5% of dibutylsilicon mercaptopropionate and the polypropylene had a melt index of 0.4. It took 48 hours for the polypropylene to degrade, an improvement of over 24 hours over the unstabilized polypropylene.

EXAMPLE 7

The procedure of Example 6 was repeated but the polypropylene was replaced by polyethylene to give a stabilized polyethylene.

EXAMPLE 8

The stabilizer was a mixture of 0.166% of dilaurylthiodipropionate and 0.166% calcium stearate. It took 72 hours for polypropylene of melt index 0.4 to degrade. This was a comparison example so that the effect on stability of polypropylene of the organosilicon compounds could be noted when employing other additives.

EXAMPLE 9

|   | Percent |
|---|---|
| Dibutylsilicon mercaptopropionate | 0.166 |
| Dilaurylthiodipropionate | 0.166 |
| Calcium stearate | 0.166 |

The polypropylene of melt index 0.4 was stable for 96 hours.

EXAMPLE 10

|   | Percent |
|---|---|
| Diphenylsilicon mercaptoacetate | 0.125 |
| Dilaurylthiodipropionate | 0.125 |
| 2,6-di-t-butyl-p-cresol | 0.125 |
| Calcium stearate | 0.125 |

A stable polypropylene of melt index 0.8 is produced.

EXAMPLE 11

|   | Percent |
|---|---|
| Dibutylsilicon di(butylmercaptopropionate) | 0.125 |
| Dilaurylthiodipropionate | 0.125 |
| 2,6-di-t-butyl-p-cresol | 0.125 |
| Calcium stearate | 0.125 |

A stable polymer of melt index 0.4 is produced.

EXAMPLE 12

|   | Percent |
|---|---|
| Tributylsilicon monomercaptopropionate | 0.125 |
| Dilaurylthiodipropionate | 0.125 |
| 2,6-di-t-butyl-p-cresol | 0.125 |
| Calcium stearate | 0.125 |

A stable polymer of melt index 0.4 is produced.

EXAMPLE 13

|   | Percent |
|---|---|
| Butylsilicon trimercaptoacetate | 0.125 |
| Dilaurylthiodipropionate | 0.125 |
| 2,6-di-t-butyl-p-cresol | 0.125 |
| Calcium stearate | 0.125 |

A stable polymer of melt index 0.4 is produced.

The stabilizer compositions can be packaged and sold as such and can be blended into the polymer of the monoolefin by the processor or user of the polymer. Alternatively, the polymer manufacturer can blend the stabilizer into the polymer and sell the stabilized polymer to the processor or ultimate user.

What is claimed is:

1. A compound having a formula selected from the group consisting of

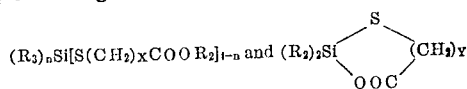

where $R_2$ and $R_3$ are selected from the group consisting of alkyl, cycloalkyl, carbocyclic aryl, and halophenyl, X is an integer, Y is an integer from 1 to 2 and $n$ is selected from the group consisting of 1 and 3.

2. A compound having the formula $$(R_3)_3SiS(CH_2)_xCOOR_2$$

where X is an integer and $R_2$ and $R_3$ are selected from the group consisting of alkyl, cycloalkyl, carbocyclic aryl, and halophenyl.

3. Trialkylsilicon alkyl mercaptoalkanoate wherein there are 2 to 4 carbon atoms in the mercaptoalkanoate portion of the molecule.

4. A compound having the formula $$R_3Si[S(CH_2)_xCOOR_2]_3$$

where X is an integer and $R_2$ and $R_3$ are selected from the group consisting of alkyl, cycloalkyl, carbocyclic aryl, and halophenyl.

5. Alkylsilicon tris alkyl mercaptoalkanoate wherein there are 2 to 4 carbon atoms in the mercaptoalkanoate portion of the molecule.

6. A compound having the formula

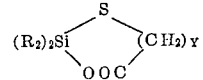

where $R_2$ is selected from the group consisting of alkyl, cycloalkyl, carbocyclic aryl, and halophenyl, and Y is an integer from 1 to 2.

7. Dialkylsilicon thioalkanoate wherein there are 2 to 3 carbon atoms in the thioalkanoate portion of the molecule.

8. Diphenylsilicon thioalkanoate wherein there are 2 to 3 carbon atoms in the thioalkanoate portion of the molecule.

References Cited by the Examiner

UNITED STATES PATENTS

| 2,767,195 | 10/1956 | Brockman et al. | 260—327 |
| 2,794,026 | 5/1957 | Johnston | 260—327 |
| 2,992,205 | 7/1961 | Broyles et al. | 260—45.8 |
| 3,014,888 | 12/1961 | Shimmin et al. | 260—45.8 |

TOBIAS E. LEVOW, *Primary Examiner.*

LEON J. BERCOVITZ, HELEN M. McCARTHY,
*Examiners.*

M. J. WELSH, P. F. SHAVER, *Assistant Examiners.*